US012769823B2

(12) United States Patent
Huseynov et al.

(10) Patent No.: US 12,769,823 B2
(45) Date of Patent: Oct. 20, 2026

(54) ANOMALY BASED KEYLOGGER DETECTION THROUGH VIRTUAL MACHINE INTROSPECTION

(71) Applicants: Research Foundation of the City University of New York, New York, NY (US); Kyushu Institute of Technology, Fukuoka (JP)

(72) Inventors: Huseyn Huseynov, Hackensack, NJ (US); Kenichi Kourai, Fukuoka (JP); Tarek Saadawi, Franklin Lakes, NJ (US); Obinna Igbe, Fremont, CA (US)

(73) Assignees: RESEARCH FOUNDATION OF THE CITY UNIVERSITY OF NEW YORK (US); KYUSHU INSTITUTE OF TECHNOLOGY (JP)

( * ) Notice: Subject to any disclaimer, the term of this patent is extended or adjusted under 35 U.S.C. 154(b) by 285 days.

(21) Appl. No.: 17/723,937

(22) Filed: Apr. 19, 2022

(65) Prior Publication Data

US 2022/0342982 A1 Oct. 27, 2022

Related U.S. Application Data

(60) Provisional application No. 63/177,147, filed on Apr. 20, 2021.

(51) Int. Cl.
*G06F 21/53* (2013.01)
*G06F 9/455* (2018.01)
(Continued)

(52) U.S. Cl.
CPC .......... *G06F 21/53* (2013.01); *G06F 9/45558* (2013.01); *G06F 18/214* (2023.01);
(Continued)

(58) Field of Classification Search
CPC ...... G06F 21/53; G06F 21/552; G06F 21/554; G06F 18/214; G06F 9/45558;
(Continued)

(56) References Cited

U.S. PATENT DOCUMENTS 10,264,020 B1 * 4/2019 Nanda ..................... H04L 43/04
10,609,057 B2 3/2020 Igbe et al.
(Continued)

FOREIGN PATENT DOCUMENTS

CN 110865866 A * 3/2020 ......... G06F 9/45558

OTHER PUBLICATIONS

Lu, T., Zhang, L., Wang, S., Gong, Q. Ransomware Detection Based on V-detector Negative Selection Algorithm. 2017 International Conference on Security, Pattern Analysis, and Cybernetics (SPAC). 2017. (Year: 2017).*
(Continued)

*Primary Examiner* — Nasser M Goodarzi
(74) *Attorney, Agent, or Firm* — Schmeiser Olsen, PLLC

(57) ABSTRACT

A malicious process detection system comprises a Virtual Machine Introspection (VMI) module that performs an introspection operation on at least one virtual machine; and an Intrusion Detection System (IDS) that communicates with the VW module to generate data that is analyzed by the IDS using a negative selection algorithm (NSA) and that identifies suspicious processes at the VM based on the analyzed data.

13 Claims, 16 Drawing Sheets

(51) Int. Cl.
*G06F 18/214* (2023.01)
*G06F 18/24* (2023.01)
*G06F 21/55* (2013.01)

(52) U.S. Cl.
CPC ............ *G06F 18/24* (2023.01); *G06F 21/552* (2013.01); *G06F 21/554* (2013.01); *G06F 2009/45587* (2013.01); *G06F 2009/45591* (2013.01)

(58) Field of Classification Search
CPC . G06F 2209/45587; G06F 2209/45591; G06F 21/00; G06F 21/50; H04L 63/1416
USPC ............................................................ 726/22
See application file for complete search history.

(56) References Cited

U.S. PATENT DOCUMENTS

| | | | | |
|---|---|---|---|---|
| 11,652,828 | B1 * | 5/2023 | Fricano | G06Q 10/06398 726/23 |
| 2012/0255001 | A1 * | 10/2012 | Sallam | G06F 21/566 726/23 |
| 2016/0127387 | A1 * | 5/2016 | Handel | G06F 21/56 726/23 |
| 2017/0142135 | A1 * | 5/2017 | Shattil | H04W 12/02 |
| 2017/0374091 | A1 * | 12/2017 | Igbe | H04L 63/1441 |
| 2018/0131716 | A1 * | 5/2018 | Chantz | H04L 63/1425 |
| 2018/0368007 | A1 * | 12/2018 | Cummings | H04L 67/51 |
| 2021/0089647 | A1 * | 3/2021 | Suwad | G06F 21/552 |

OTHER PUBLICATIONS

Seresht, N. A., Azmi, R. MAIS-IDS: A distributed intrusion detection system using multi-agent AIS approach. Engineering Applications of Artificial Intelligence, Elsevier, pp. 286-298;. 2014. (Year: 2014).*

Narasima, M. K., Preethi, S. R., Selvalakshmi, S., Nithish, N. Detection of Spyware in Software Using Virtual Environment. Third International Conference on Trends in Electronics and Informatics (ICOEI 2019). 2019. (Year: 2019).*

Fu, J., Liang, Y., Tan., C., Xiong, X., Detecting Software Keyloggers with Dendritic Cell Algorithm, 2010 International Conference on Communications and Mobile Computing. 2010. (Year: 2010).*

Golovko, V., Bezobrazov, S., Melianchuk, V., Komar, M., Evolution of Immune Detectors in Intelligent Security System for Malware Detection, 6th IEEE International Conference on Intelligent Data Acquisition and Advanced Computing Systems: Technology and Applications. Sep. 15-17, 2011. 2011. (Year: 2011).*

Said, W., Mostafa, A. M., Towards a Hybrid Immune Algorithm Based on Danger Theory for Database Security, IEEE Access vol. 8, 2020. (Year: 2020).*

Melo, R. V., D. J. de Marcelo, D. A Cloud Immune Security Model Based on Alert Correlation and Software Defined Network. 2019 IEEE 28th International Conference on Enabling Technologies: Infrastructure for Collaborative Enterprises (WETICE). 2019. (Year: 2019).*

Kumara, A., Jaidhar, C. D., Hypervisor and Virtual Machine Dependent Intrusion Detection and Prevention System for Virtualized Cloud Environment. 2015 1st International Conference on Telematics and Future Generation Networks (TAFGEN). 2015. (Year: 2015).*

Kumara, A., Jaidhar, C. D., Virtual Machine Introspection based Spurious Process Detection in Virtualized Cloud Computing Environment. 2015 1st International Conference on Futuristic Trend in Computational Analysis and Knowledge Management (ABLAZE-2015). 2015. (Year: 2015).*

Kumara, A., Jaidhar, C.D. Leveraging Virtual Machine Introspection with Memory Forensics to Detect and Characterize Unknown Malware Using Machine Learning Techniques at Hypervisor. Digital Investigation, vol. 23, 2017. pp. 99-123. (Year: 2017).*

Zeng, J., Tang, W. (2014). An Artificial Immune System Approach for Malware Detection. In: Pan, L., Păun, G., Pérez-Jiménez, M.J., Song, T. (eds) Bio-Inspired Computing—Theories and Applications. Communications in Computer and Information Science, vol. 472. Springer, Berlin, Heidelberg. 2014. (Year: 2014).*

Harmer, P.K., Williams, P.D., Gunsch, G. H., Lamont, G. B. "An Artificial Immune System Architecture for Computer Security Applications". IEEE Transactions on Evolutionary Computation, vol. 6, No. 3, Jun. 2002. (Year: 2002).*

Marhusin, M. F., Cornforth, D., Larkin, H. "Malicious Code Detection Architecture Inspired by Human Immune System". Aug. 6-8, 2008. IEEE. 2008. doi: 10.1109/SNPD.2008.160 (Year: 2008).*

Mohan, A., Nadgowda, S., Pipaliya, B., Varma, S., Suneja, S., Isci, C., Cooperman, G., Desnoyers, P. Krieger, O., Turk, A. "Towards Non-Intrusive Software Introspection and Beyond". Apr. 21-24, 2020. IEEE. doi: 10.1109/IC2E48712.2020.000 (Year: 2020).*

Harrison, C., Cook, D., McGraw, R., Hamilton Jr., J. A. "Constructing a Cloud-Based IDS by Merging VMI with FMA". Jun. 25-27, 2012. IEEE. doi: 10.1109/TrustCom.2012.113 (Year: 2012).*

Garfinkel, T., Rosenblum, M. "A Virtual Machine Introspection Based Architecture for Intrusion Detection." Network and Distributed System Security Symposium (2003). (Year: 2003).*

Le, D. et al.; Detecting Kernel Level Keyloggers Through Dynamic Taint Analysis; College of William & Mary Department of Computer Science Technical Report; May 7, 2008; 13 pages.

Huseynov, H. et al.; Cyber Security IDS in VM; 2020 IEEE 21st International Conference on High-Performance Switching and Routing (HPSR), May 2020; 21 pages.

Fu, J. et al.; Enhancing Keylogger Detection Performance of the Dendritic Cell Algorithm by an Enticement Strategy; Journal of Computers; Jun. 2014; pp. 1347-1354; vol. 9, No. 6.

Kouri, K. et al.; Secure Offloading of Legacy IDSes Using Remote VM Introspection in Semi-trusted Clouds; 2016 IEEE 9th International Conference on Cloud Computing (Cloud); Jun. 27, 2016-Jul. 2, 2016; 8 pages; DOI: 10.1109/CLOUD.2016.0016.

Wang, D. et al.; Exploiting Artificial Immune Systems Todetect Unknown DoS Attacks in Real-Time; 2012 IEEE 2nd International Conference on Cloud Computing and Intelligence Systems; Oct. 30, 2012-Nov. 1, 2012; 5 pages; DOI: 10.1109/CCIS.2012.6664254.

Dasgupta, D. et al.; Immunological Computation: Theory and Applications; Chapter 4, T Cell-Inspired Algorithms; pp. 61-109; Sep. 12, 2008.

Benvenuti, C.; Understanding Linux Network Internals, 2nd ed. Sebastopol, CA: O'Reilly, 2006, pp. 541-555.

Kouri, K. et al.; Efficient VM Introspection in KVM and Performance Comparison with Xen; 2014 IEEE 20th Pacific Rim International Symposium on Dependable Computing; Nov. 18-21, 2014; 11 pages; DOI: 10.1109/PRDC.2014.33.

Igbe, O. et al.; Distributed Network Intrusion Detection System: An Artificial Immune System Approach; 2016 IEEE First International Conference on Connected Health: Applications, Systems and Engineering Technologies (CHASE); Jun. 27-29, 2016; 7 pages; DOI: 10.1109/CHASE.2016.36.

Huseynov, H. et al.; Virtual Machine Introspection for Anomaly-Based Keylogger Detection; 2020 IEEE 21st International Conference on High Performance Switching and Routing (HPSR); May 11-14, 2020; 6 pages; DOI: 10.1109/HPSR48589.2020.9098980.

De Rainville, F., et al., "DEAP: a Python Framework for Evolutionary Algorithms" Proceedings of the 14th annual conference companion on Genetic and evolutionary computation (GECCO '12), Association for Computing Machinery, New York, NY, USA, pp. 85-92, 2012, doi: https://doi.org/10.1145/2330784.2330799.

Awesome Open Source, "The Top 10 Keylogger Open Source Projects", https://awesomeopensource.com/projects/keylogger.

GitHub, "logkeys—a GNU/Linux keylogger", https://github.com/kernc/logkeys.

GitHub, "blueberry: simple and easy to use keylogger for linux", https://github.com/PRDeving/blueberry.

GitHub, "Keylogger: Inputs to Mail", https://github.com/aydinnyunus/Keylogger.

* cited by examiner

300

```
...
INDIVIDUAL_SIZE  24
POPULATION_SIZE  500
GENERATION_SIZE  200
POOL_WORKERS       4
MMAP_MIN_SIZE    4096
...
```

Sample list of generated detectors

```
...
60884   000100000011001010010011
60885   111111011011010010001011
60886   000110110000000100101101
60887   101100010011000010110100
60888   001111010011110011011011
60889   011101011010110111110101
60890   011111110011011111100111
60891   100111010000110010110100
60892   010101110010100010101000
...
```

500

| Keylogger | Detection | Note |
| --- | --- | --- |
| Logkeys | ✓ | Multi-functional GNU/Linux keylogger. Logs all common and function keys [8] |
| Blueberry | ✓ | Opens a stream to the keyboard event handler and gets every key press. Create logs when the buffer gets 250 characters and sends it to remote server over TCP protocol [9] |
| EKeylogger | ✓ | Sends recorder keystrokes every 10 sec directly to email address [10] |

PRIOR ART

FIG. 5

700

```
...
Gen 8
   1       0       4652      0    0
   577     0       2920      0    0
   601     0       620       0    0
   795     24576   10932     1    0
   4436    98304   0         1    0
   5200    45602   0         1    T
Detected
Process ID: 4436 Fitness: 28.90
Process ID: 5200 Fitness: 17.70
...
```

FIG. 7

1000

| | |
|---|---|
| ... | |
| 60884 | 000100000011001010010011 |
| 60885 | 111111011011010010001011 |
| 60886 | 000110110000000100101101 |
| 60887 | 101100010011000010110100 |
| 60888 | 001111010011110011011011 |
| 60889 | 011101011010110111110101 |
| 60890 | 011111110011011111100111 |
| 60891 | 100111010000110010110100 |
| 60892 | 010101110010100010101000 |
| ... | |

FIG. 10

1100

| Malware | Detection Accuracy (%) | Description |
|---|---|---|
| **Logkeys** | 99 | Multi-functional GNU/Linux keylogger. Logs all common character and function keys [8] |
| **maK_it-Linux-Rootkit** | 94 | Linux based rootkit that listens to certain ports, gives escalated privileges to user, has built-in keylogger and able to hide from common scanners [16] |
| **Stitch** | 97 | Cross-platform keylogger with remote administrative tool. User can select payload to bind into specific IP and port, listens for a connection on that port, has option to send an email of system info when the system boots, and option to start keylogger on boot [17] |
| **TrojanX** | 94 | Basic Trojan application written in Swift with minimal GUI client on Mac OS. Uses shell scripts to set up the system to use SOCKS proxy [18] |

FIG. 11

ANOMALY BASED KEYLOGGER DETECTION THROUGH VIRTUAL MACHINE INTROSPECTION

RELATED APPLICATIONS

This application claims priority to U.S. Provisional Application Ser. No. 63/177,147 filed Apr. 20, 2021 entitled "ANOMALY BASED KEY-LOGGER DETECTION THROUGH UNIX®-BASED VM INTROSPECTION," the entirety of each of which is incorporated by reference herein.

FIELD OF THE INVENTION

The inventive concepts relate generally to cybersecurity. More specifically, the inventive concepts relate to the integration of an Artificial Immune System (AIS)-based IDS into a Virtual Machine (VM) environment for keylogger detection.

BACKGROUND

With the proliferation of Internet of Things (IoT) technology for smart Internet-connected devices, ranging from in-store beacons to remote-controlled HVAC (heating, ventilation and air conditioning) systems, the risk of cyberattacks continues to grow. Whether data is stored locally or at a cloud computing environment, the risk of a security breach is present where a hacker can access user credentials or other sensitive information. Moreover, edge computing expands the potential attack surface by having sensitive data stored and processed across a more extensive array of systems. It is increasingly more difficult to protect ubiquitous computing environments at scale simply because the footprint is too large, in particular, the proliferation of cloud-computing, edge computation, and fifth generation (5G) mobile radio systems. Despite the risks, technological progress is inevitable and the modern trend is to transition enterprise information technology to a cloud-computing environment. The challenge lies in incorporating security into electrical device designs. As inherent security features are integrated into end-user devices and edge data centers, it is desirable to create expansive networks with minimal vulnerabilities.

SUMMARY in one aspect, a keylogger detection system comprises a virtual machine; a host operating system; an Intrusion Detection System (IDS) on the host operating system, comprising: a Virtual Machine introspection (VMI) module that accesses the virtual machine to interrogate the virtual machine for possible keylogger events; an Artificial Immune System (AIS)-based detection module that generates a plurality of detectors that distinguishes normal processes from characteristics of malicious processes; and a data processing module that matches an output of the VMI module in response to interrogating the virtual machine with the detectors to identify a suspicious process of the possible keylogger events at the virtual machine.

In another aspect, a malicious process detection system, comprises a Virtual Machine Introspection (VMI) module that performs an introspection operation on at least one virtual machine; and an Intrusion Detection System (IDS) that communicates with the VMI module to generate data that is analyzed by the AIS using a negative selection algorithm (NSA) and that identifies suspicious processes at the VM based on the analyzed data.

In another aspect, a host-based Intrusion Detection System (HIDS) runs on a UNIX® or UNIX®-like operating system; and includes a lightweight and secure VMI program that performs a Virtual Machine introspection operation and provides an API for an Intrusion Detection System (IDS) to securely collect and analyze data from one or more virtual machines and further includes an AIS-based detector generation software applications.

In another aspect, a method of tracking cyberattacks comprises detecting cyberattacks within virtualized environment; and implementing an Artificial Intelligence (AI) based algorithm to detect system and network-based anomalies within a UNIX® operating system.

In another aspect, a computer program employs an AI based algorithm to generate a pattern for output to an Intrusion Detection System.

In another aspect, a computer program operates on a WINDOWS® or UNIX®-like systems and serves as a client application to periodically communicate with a remote IDS and check its latest status; and inform a client about potential threats detected by the remote IDS.

In another aspect, a keylogger detection system comprises a virtual machine having a memory; an Intrusion Detection System (IDS), comprising: a Virtual Machine Introspection (VMI) module that accesses the memory of the virtual machine to interrogate the virtual machine for possible keylogger events; an Artificial Immune System (AIS)-based detection module that generates a plurality of detectors that distinguishes normal processes from characteristics of a malicious process; and a data processing module that matches an output of the VMI module in response to interrogating the virtual machine with the detectors to identify malicious processes of the possible keylogger events at the virtual machine.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is a table of three different open source keyloggers used for providing experimental data performed in accordance with some embodiments.

FIG. 7 is an illustration of an output of a detection process while executing two keyloggers on a guest machine performed in accordance with some embodiments.

FIG. 10 is an illustration of a sample of detectors generated by a detection generation application and output from a Genetic Algorithm (GA), in accordance with some embodiments.

FIG. 11 is a table illustrating various malware used in a cyberattack and detection results generated according to some embodiments.

DETAILED DESCRIPTION

Figure 1:
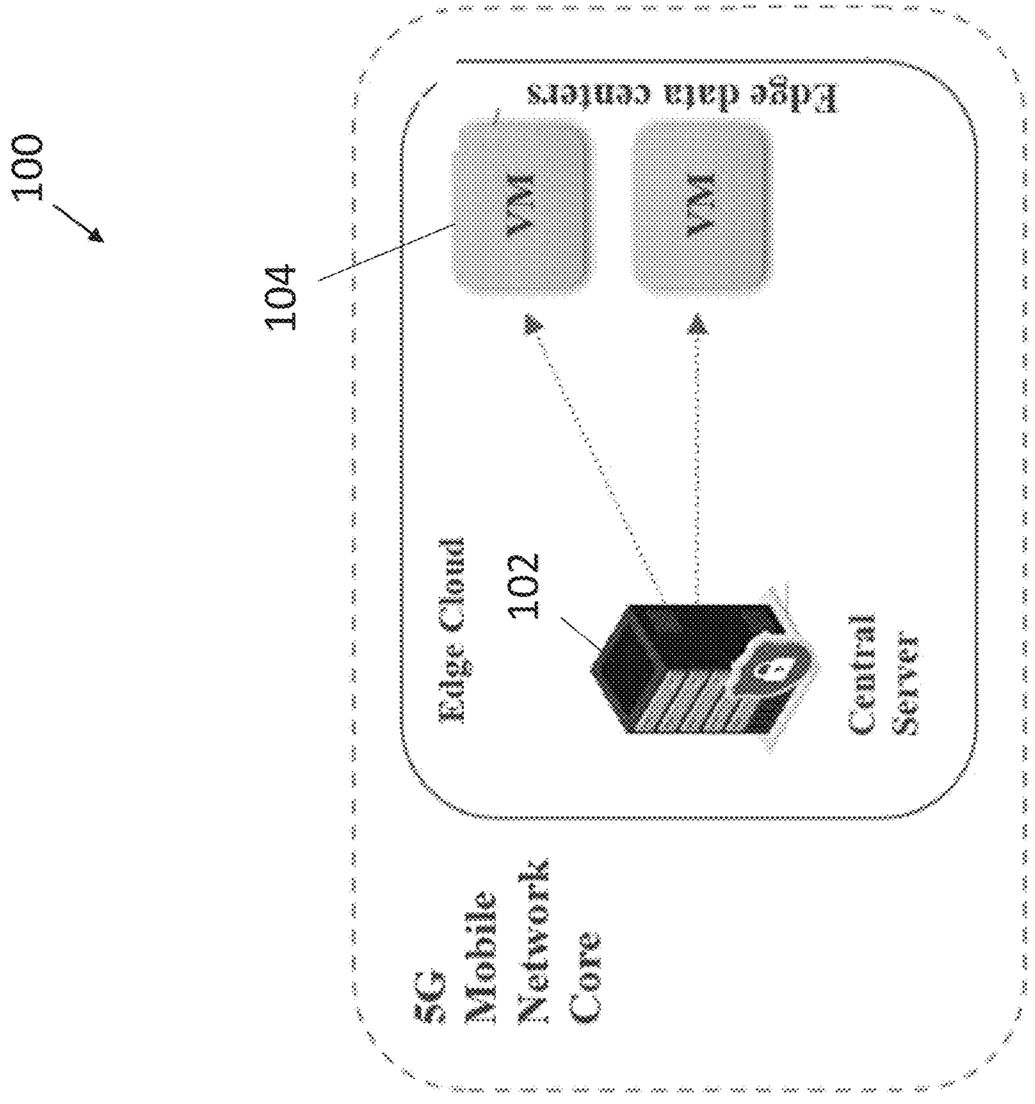
FIG. 1 is a general diagram of an edge computing network, in which embodiments of the present inventive concepts can be practiced.

FIG. 1 is a general diagram of an edge cloud computing network 100, in which embodiments of the present inventive concepts can be practiced. The edge computing network 100 may include a central server 102 and a plurality of VMs 104, which may be located at a data center, a cloud computing environment, or the like. In some embodiments, the edge computing network 100 may be part of a 5G mobile network core, but not limited thereto.

The edge computing network 100 may store sensitive security assets, which can be compromised by a security breach at virtualized functions at the edge computing network 100. For example, a cyberattack may permit the unlawful actor to maliciously reuse the security assets to gain connectivity to the edge computing network 100 or carry out a spoofing, eavesdropping, or data manipulation attack.

In brief overview, embodiments of the present inventive concept relate to an Intrusion Detection System (IDS) including a Virtual Machine Introspection (VMI) system that is constructed and arranged to introspect multiple virtual machines (VMs) to detect malicious applications, e.g., keyloggers, adware, rootkits, trojans, etc., while operating external to the infected VM. In some embodiments, the IDS can be located on the central server 102 of FIG. 1, and continuously check all the connected VMs 104 providing a fast and reliable response. Here, an architecture can be employed where a host operating system and a virtual machine layer actively collaborate to guarantee kernel integrity. This collaborative approach allows the VMI system to introspect a VM by tracking events such interrupts, system calls, memory writes, network activities, etc. and to detect suspicious processes by employing necessary IDS algorithms.

Software keyloggers are one of the most serious types of malware that surreptitiously log keyboard activity and exfiltrate the recorded data to third parties. For example, a keylogger software program can record every keystroke of a computer user, acquire entered information such as a username and password, and send this information to malicious users via the Internet.

Despite many conducted research and commercial efforts, keyloggers can pose a significant threat of stealing personal and commercial information. Here, a LINUX® operating system or the like can process entered keystrokes, the mechanist behind a LINUX® keyboard driver. A single key press initiated by a user can produce a sequence of up to six corresponding scan-codes to the keyboard driver. In some embodiments, the IDS includes a detector generator including an Artificial Intelligence (AD) interface to generate and process detectors use to train an AI system to AI recognize malicious processes.

The VMI system can effectively detect keyloggers and timely notify system administrator about detected anomalies. The VMI system an address several security issues from outside of the guest operating system (OS) without relying on functionality that can be rendered unreliably by advanced malware. The VMI system can track events such as interrupts, memory read/writes, network activities, or other keyboard events since it has access to the memory of the virtual machine(s) of interest. Collected data is then being processed and analyzed as part of the IDS for anomaly detection.

Since modem edge computing technology extends its performance through virtualization technology, embodiments of the systems and methods for anomaly-based keylogger detection through UNIX®-based VM inspection can provide a secure environment by constantly checking virtual machines from the host operating system (OS). For example, a VMI system can allow security of VMs to be undertaken at a server-side node, without installing an IDS in all VMs or requiring frequent VM device upgrades. Referring again to FIG. 1, The IDS, once installed on a central server 102, can introspect multiple virtual machines 104 (or edge data centers) providing the computer power necessary to handle system security and ensure strong protection against malicious activities. By employing an evolutionary Negative Selection Algorithm (NSA), the application can learn and improve itself generation after generation. Thus, contrary to the existing signature-based threat detection techniques, where computer protection is only assured against keyloggers that are in a signature-base list, a keylogger detection system in accordance with embodiments herein provides a comprehensive protection against any types of keyloggers because suspicious processes are detected external to a virtual machine and therefore also identify malware that surreptitiously infiltrates the VM without the need to install an IDS and subsequent upgrades in all VMs.

Embodiments of the keylogger detection system focus on detection of wide range types of keyloggers on various virtual machines such as LINUX®-based virtual machines but not limited thereto. For example, unlike other classes of keyloggers, a user-space keylogger is a background process which registers operating system (OS) supported hooks to surreptitiously eavesdrop and log every keystroke issued by the user into the current foreground application. On the other hand, a kernel-based keylogger is a program that obtains root access to hide itself in the OS and intercepts keystroke that pass through the LINUX® kernel, Such keyloggers reside at the kernel level, which makes them difficult to detect, especially for user-mode applications that don't have root access. Embodiments of the disclosed system, in detecting these malicious applications, prevents them from stealing confidential data originally intended for a (trusted) legitimate foreground applications.

In some embodiments, the disclosed system constantly introspects a virtual machine and includes an Artificial Immune System (AIS) based application that processes results of the introspection of the virtual machine to generate detectors, which in turn can identify potential anomalies, threats, and the like. AIS is a well-known paradigm based on the human immune system (HIS). AIS is fully distributed and requires no central controller. An AIS generally uses a Genetic Algorithm (GA) based Negative Selection Algorithm (NSA). For example, GA optimized detectors are trained using NSA for distinguishing foreign cells and endemic cells. In some embodiments, a GA may be part of the IDS and integrated in the virtualization software application. For example, a separate program, which uses NSA, takes as input a list of features that belongs to normal processes. Based on a fitness function implemented in Genetic Algorithm, the application can produce a list of detectors, namely, data converted into a binary strings that represent features of abnormal processes. For example, an AIS-based detectors generation module can independently generate detectors using NSA, based on list of properties of normal processes.

Figure 2:
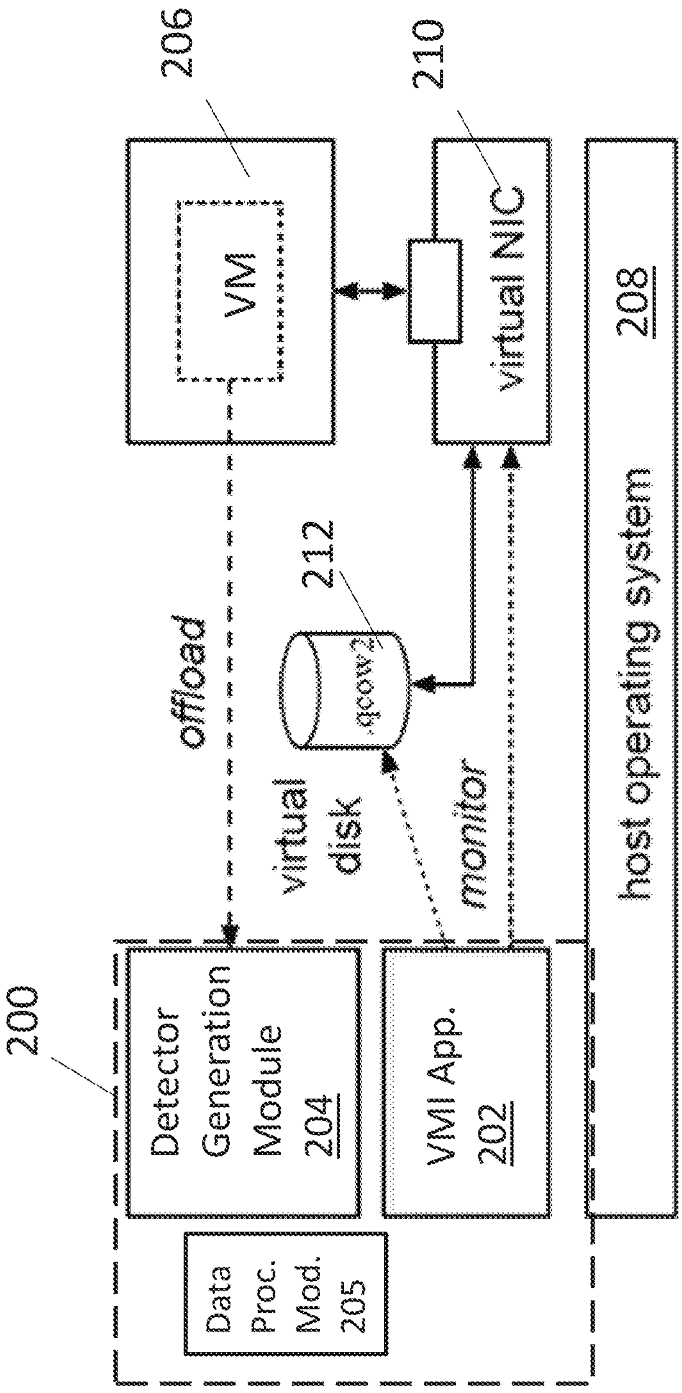
FIG. 2 is a block diagram of an Intrusion Detection System (IDS), in accordance with some embodiments.

FIG. 2 illustrates an IDS 200 operating on a host operating system 208 in a host machine, in accordance with some embodiments. In some embodiments, the IDS 200 is constructed and arranged to detect keylogger-related activity at one or more VMs 206, all of which may coexist on the host machine. The IDS 200 may include a Virtual Machine Introspection (VMI) module 202, a detector generation module 204, and a data processing module 205, also collectively be referred to as a keylogger detection system.

The IDS 200 detects potentially harmful malware and makes it very difficult for the malware to determine that it is being monitored and analyzed. The VMI module 202 can perform operations disclosed by K. Kourai and K. Nakamura in an article entitled "Efficient VM Introspection in KVM and Performance Comparison with Xen," Department of Creative Informatics, Kyushu Institute of Technology, Fukuoka, Japan 2014 IEEE 20th Pacific Rim International Symposium on Dependable Computing, November 18-21, Singapore, Singapore, DOI: 10.11091PRDC.2014.33 3) and K. Kourai and K. Juda in an article entitled "Secure Offloading of Legacy IDS Using Remote VM Introspection in Semi-trusted Clouds," Department of Creative Informatics, Kyushu Institute of Technology, Fukuoka, Japan, 2016 IEEE 9th International Conference on Cloud Computing (CLOUD), June 27-July 2, San Francisco, CA, USA, DOI: 10.1109/CLOUD.2016, each incorporated by reference herein in its entirety. Such operations permit the VMI module 202 to analyze the memory, disks, network and other system components of the VMs 206 for security-related activity, such as keylogger events.

For example, the VMI module 202 can execute a CR3 command using a QEMUIN monitor protocol (QMP), which is based on JavaScript object notation (JSON). Although QEMU™ is described herein, other generic and open-source machine emulators and virtualizers may equally apply. When the VMI module 202 connects to a virtual network device 210, such as a virtualization hypervisor or the like, that is part of the guest VM device, e.g., a PCI network card) or QEMU-KVM, the latter returns version information, To enable a QMP, the VMI module 202 can output a qmp_capabilities command or the like. Then it sends a command (e.g., CR3) and receives a result, shown by way of example as follows

```
{ "execute": "cr3" }
{ "return": { "CR3": "0x000000001f96e000" } }
```

-continued

```
{ "execute": "xaddr",
  "arguments": { "addr": "0xffffffff814a8340" } }
{ "return": { "paddr": "0x00000000014a8340" } }
```

In this example, after obtaining the values of the CR3 register, the VMI module 202 looks up a local address in the memory-mapped file from a virtual address. In some embodiments, the VMI module 202 can produce a report with the following data sets and structure from its analysis of memory of the VM 206:

Image Information. Kernel version, size of kernel memory shift, CR3 register value, VM name.

Debugged Processes. The processes that are under direct control of a separate process.

In-Memory Files, Returns PID of the process(es) whose address space contains the mapped file along with the path of the in-memory file.

Kernel Interrupt Table. Table lookups are triggered by three types of events: hardware interrupts (e.g., keyboard keystrokes or I/O at a network port), software interrupts (e.g., call to the kernel to perform an I/O request), or processor exceptions (e.g., such as an access violation or divide by zero).

Kernel System Calls. Entry points through which user-mode code can call functions in the LINUX® kernel.

Networks. The address resolution protocol (ARP, OSI layer 3) and active sockets. Information about IP (v4 or v6) address registered on the interface.

Open Files. All filesystem objects (including files, devices) to which a process has an open handle.

Processes. Set of processes running on the VM instance.

UNIX® Sockets. Interprocess communication (IPC) mechanisms that enables bidirectional data exchange among multiple processes running on the same host.

The VMI report is used by a matching program, which in some embodiments is part of the detector generation module 204 and in other embodiments is part of the data processing module 205. The matching program periodically calls the VMI module 202, receives data (report) to perform a match and returns status of the VM 206. For example, the matching program collects the VMI output and compares it with the list of detectors.

As shown in FIG. 2, to introspect a virtual disk with a default format, e.g., qcow2 format, the VMI module 202 uses the network block device (NBD) for the virtual network device 210. The qcow2 format has an advantage of saving disk space by allocating a real disk space only to used disk blocks, not to the whole blocks. Thus, using NBD, the VMI module 202 can mount a disk image at a virtual disk 212 as a virtual block device and provide the VW module 202 with an execution environment for introspecting the virtual disk 212.

In some embodiments, the VMI module 202 provides an application program interface (API) for the 200 to securely collect and analyze data from one or more virtual machines 206

Figure 3:
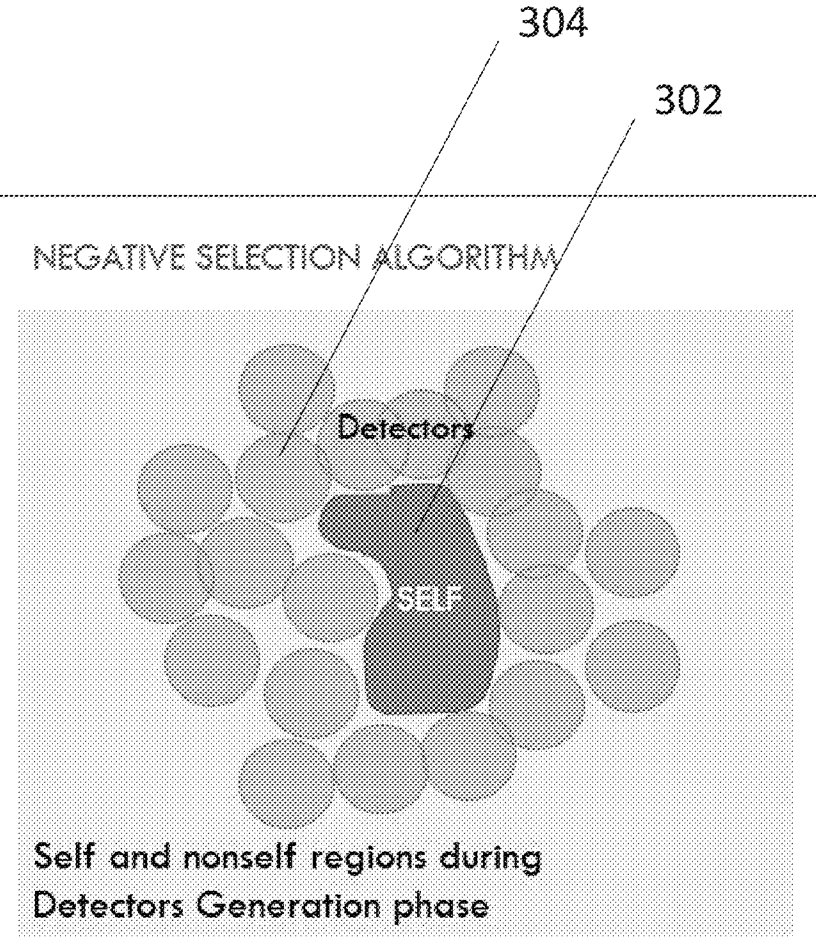
FIG. 3 is an illustration of a plurality of self and non-self-regions of an immune system according to a Negative Selection Algorithm (NSA) in which embodiments of the present inventive concepts can be practiced.

In some embodiments, the detector generation module 204 can reside on a host operating system 208 in a host machine and can constantly request the VMI module 202 to provide data to the detector generation module 204 at predetermined time intervals, for example, every 10 seconds for identifying keylogger-related events of interest. For each time of utilization, the detector generation module 204 collects necessary event data from the VMI module 202 such as interrupts, system calls, memory writes, network activities and other required information. Once the data has been collected, the detector generation module 204 can start to perform a detection operation. In some embodiments, the detection operation is part of an NSA in order to distinguish normal processes or processes otherwise deemed acceptable by the IDS or other security device from suspicious, also known as "Self/Nonself Discrimination". Here, as shown in FIG. 3, an immune system 300 can recognize which cells are its own (self) 302 and which are foreign (non-self) 304. Therefore, it is able to build its defense against the attacker instead of self-destructing. This feature is described in O. Igbe, T. Saadawi, I. Darwish "Digital Immune Systems for Intrusion Detection on Data Processing Systems and Networks," Dept. of Electrical Engineering, City University of New York, City College, U.S. Pat. No. 10,609,057 B2, issued Mar. 31, 2020, incorporated by reference herein in its entirety. Similarly, by collecting required features and running an NSA or the like, the detector generation module 204 can distinguish between regular processes and key loggers.

Two important aspects of an NSA are detector generation and non-self detection. In a first step, a plurality of detectors 304, analogous to non-self cells, are generated by a randomized process executed by the detector generation module 204 that uses a collection of self, or normal processes 302 as the input. For this purpose, a GA is employed. This model can be applied to the abovementioned keylogger detection process, where the NSA algorithm permits candidate detectors that match any of the self-samples by the data processing module 205 to be eliminated, whereas unmatched ones are kept. Particularly, the goal of negative selection is to cover the non-self space with an appropriate set of detectors, as shown in FIG. 3.

GAs are adaptive heuristic search algorithms based on the evolutionary ideas of natural selection and genetics. As such, they represent an intelligent exploitation of a random search used to solve optimization problems. Each generation of detectors comprises a population of keyboard character strings that are analogues to the chromosome that we see in our DNA. Each individual represents a point in a search space and a possible solution. The individuals in the population are then made to go through a process of evolution, described for example in D. Dasgupta, L. Fernando *Immunological Computation. Theory and Applications,* 2009, Auerbach Publications, pp. 61-109, incorporated by reference herein in its entirety.

In some embodiments, an NSA receives a list of normal processes and based a given fitness function, the Genetic Algorithm (as part of NSA) generates a list of detectors. Each detector may be considered as a combined characteristic of the malicious application (keylogger). For example, one detector "0001011010000101 10" when converted into binary is becoming "800 2202 1600 550", where the first number is how many bytes process is written, the second is how many are read, or sent over a network, how many open files this process has, and so on. The VMI module 202 in this example receives a string "800 2202 16000 550" from the VM 206 and sends it to the matching program 205, which converts it to a binary format and perform a matching operation with the list of detectors. If any match occurs, then the process is considered malicious. In some embodiments, the data processing module 205 performs the match operation. In other embodiments, the detector generation module 204 may provide the match operation feature. Here, in doing so, the detector generation module 204 includes a matching module that is part of a keylogger detection program, which constantly operates and sends alarms in case of positive match.

Figure 4:
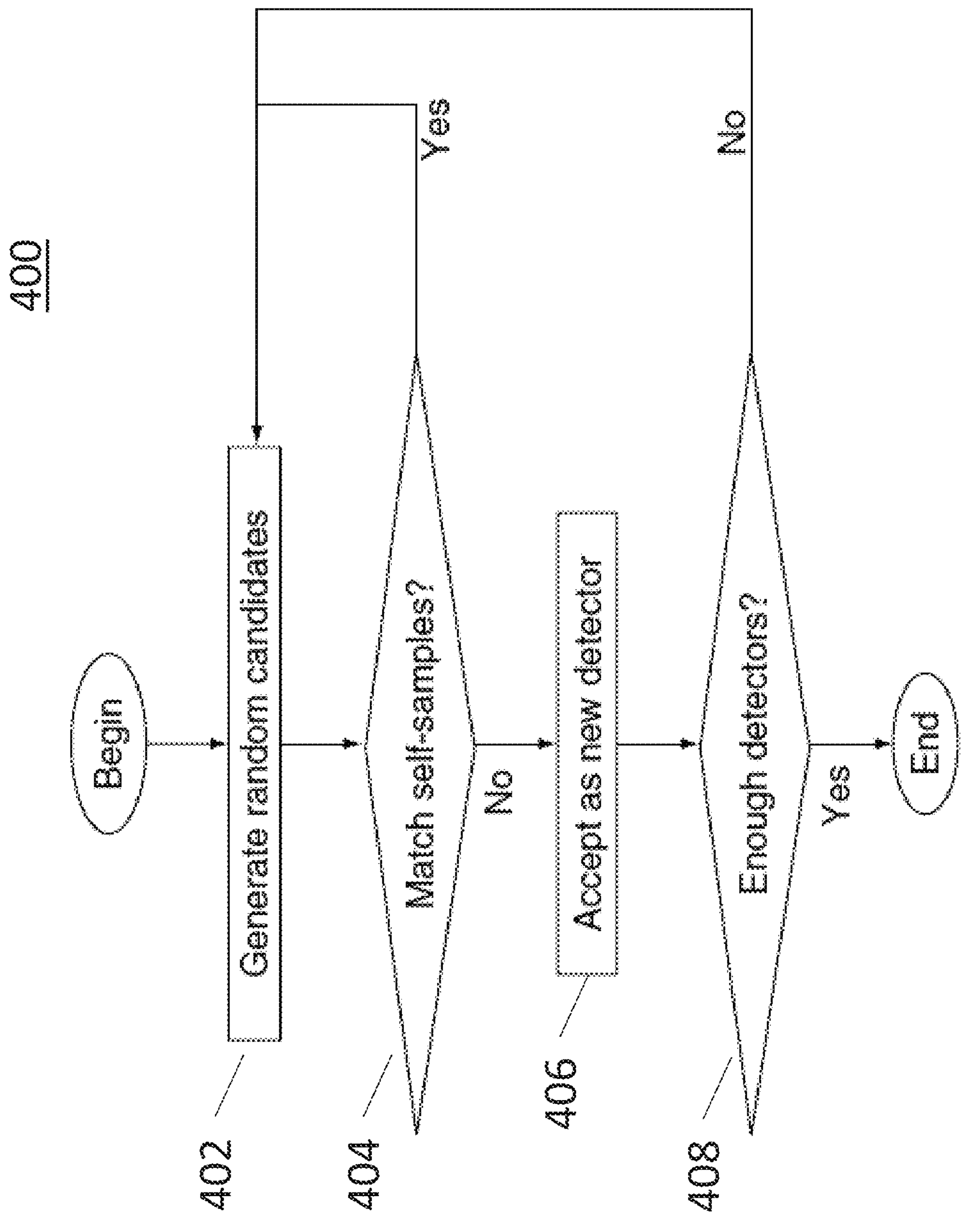
FIG. 4 is a flow diagram of a detector generation process, in accordance with some embodiments.

In some embodiments, a detector can be defined as d=(C, $r_d$), where C={$c_1$, $c_2$, . . . , $c_m$}, $c_i \in \mathbb{R}$, as an in-dimensional point that corresponds to the center of a unit hypersphere with $r_d \in \mathbb{R}$ as its unit radius. As shown in the detector generation process 400 of FIG. 4, randomly generated detectors (step 402) determined by the data processing module 205 to match (decision diamond 404) any self-sample are discarded, and the new detector is accepted (step 406). As shown, the detector generation process 400 is halted (End) when the desired number of detectors is obtained (decision diamond 408). In some embodiments, to determine by the data processing module 205 if at decision diamond 404 a detector d=(C, $r_d$) matches any normal profile, the distance (D) between the detector and its nearest self-sample neighbor, $r_s$) ES is computed, where $X^{normal}$ is also an m-dimensional point {$x_1^{normal}$, $x_2^{normal}$, . . . , $x_m^{normal}$) and corresponds to the center of a unit hypersphere with $r_s$ as its unit radius. The distance (D) is obtained using Euclidian distance measure given by equation (1).

$$\sqrt{\sum_{i=1}^{m}\left(c_i - x_i^{normal}\right)^2} \tag{1}$$

A variable radius is assigned to the new detector sample based on the minimum distance from the detector that is going to be retained from its nearest self/normal profile (i.e., (D)-$r_s$). For any instance in the testing data, if the radius of its hypersphere falls within the radius covered by any stored detector, this instance is considered to be anomaly, otherwise it is considered to be normal.

To evaluate the ability to detect real-world keyloggers, experimental data was produced using several keyloggers from an open-source software list, e.g., FIG. 5. The system configuration for producing the experimental data included the following:

HOST: Intel® Core™ i5 2.5 GHz CPU, Memory 16 GB DDR4-2400 PC4 SO-DIMM, OS Ubuntu 18.04 LTS GUEST: QEMU/KVM, Allocated CPUs "3", Allocated memory 2 GB, Virtual Network Interface "virtio" over bridge, Channel Device "spicevmc", Virtual Input Device "Generic PS2 Keyboard", OS Ubuntu 18.04 LTS Each keylogger was installed in a virtual machine, e.g., VM 206 shown in FIG. 2. An IDS according to some embodiments, for example, described with reference to FIG. 2 was launched from the host machine. The results were recorded. Three different open source keyloggers were used as shown in the Table 500 illustrated in FIG. 5 to provide the experimental results.

Figure 6B:
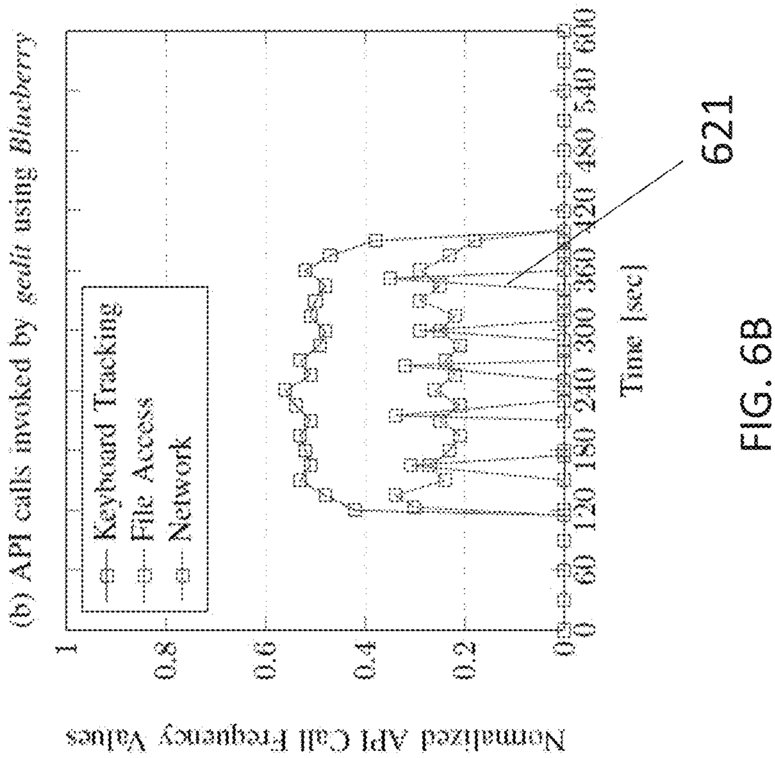
FIGS. 6A and 6B are graphs illustrating virtual machine introspection results in response to an activated keylogger of FIG. 5.
Figure 6A:
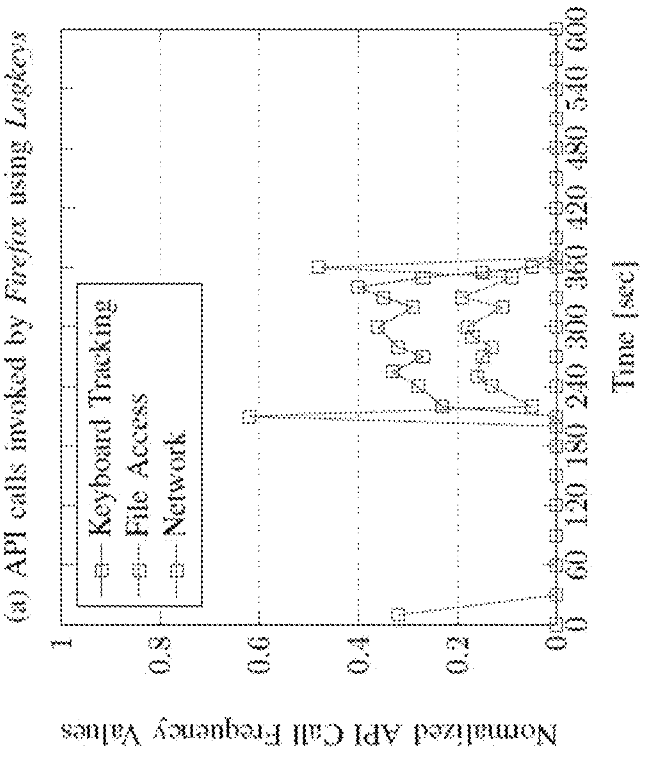

Here, two cases were provided to show the detection performance of the disclosed system. In the first case, each keylogger was monitored for a scenario where short sentences (30-85 characters) were typed in an address bar of a Mozilla Firefox™ browser as shown in FIG. 6A. In the second case, long sentences (300-1350 characters) were typed using Ubuntu's default text editor gedit as shown in FIG. 6B. In both cases, after starting the keylogger in the VM 206, the typing process began after the first 60 seconds of waiting.

The result of virtual machine introspection with the activated Logkeys keylogger provided in the chart 610 of FIG. 6A. In this example, a short sentence (30-85 characters) was typed into the address bar of the Firefox browser. The X-axis represents time in seconds while the Y-axis represents normalized value of API call frequencies. The normalized API call frequency values represent the total value obtained during 10 seconds divided by the maximum value of the whole period (600 seconds).

As shown from the chart 620 of FIG. 6B, a network indicator 621 changes its frequency periodically. This is because once the number of entered characters become 250, a Blueberry keylogger saves data from the buffer to a log file, establishes a network connection, a TCP connection, and sends the logs to a remote server. Therefore, each time the keylogger sends data, normalized API call frequency for a network graph amplifies. Similar results have been obtained from running EKeylogger on the VM. To get closer to real user keystroke patterns, about 200 commonly used English sentences are collected, and they are typed—one by one—in corresponding scenarios. The output 700 shown in FIG. 7 represents embodiments of a detection process while running two keyloggers on the guest machine (e.g., a QEMU-KVM hypervisor 210 shown in FIG. 2), in particular, keyloggers Logkeys (PID=4436) and Blueberry (PID=5200), for example, shown in FIG. 5. In this example, the Blueberry device is started with delay of 120 seconds after the Logkeys keylogger has been executed. As shown from the output 700, captured in the middle of running process, the application can detect both keyloggers on the $8^{th}$ generation.

Figure 8:
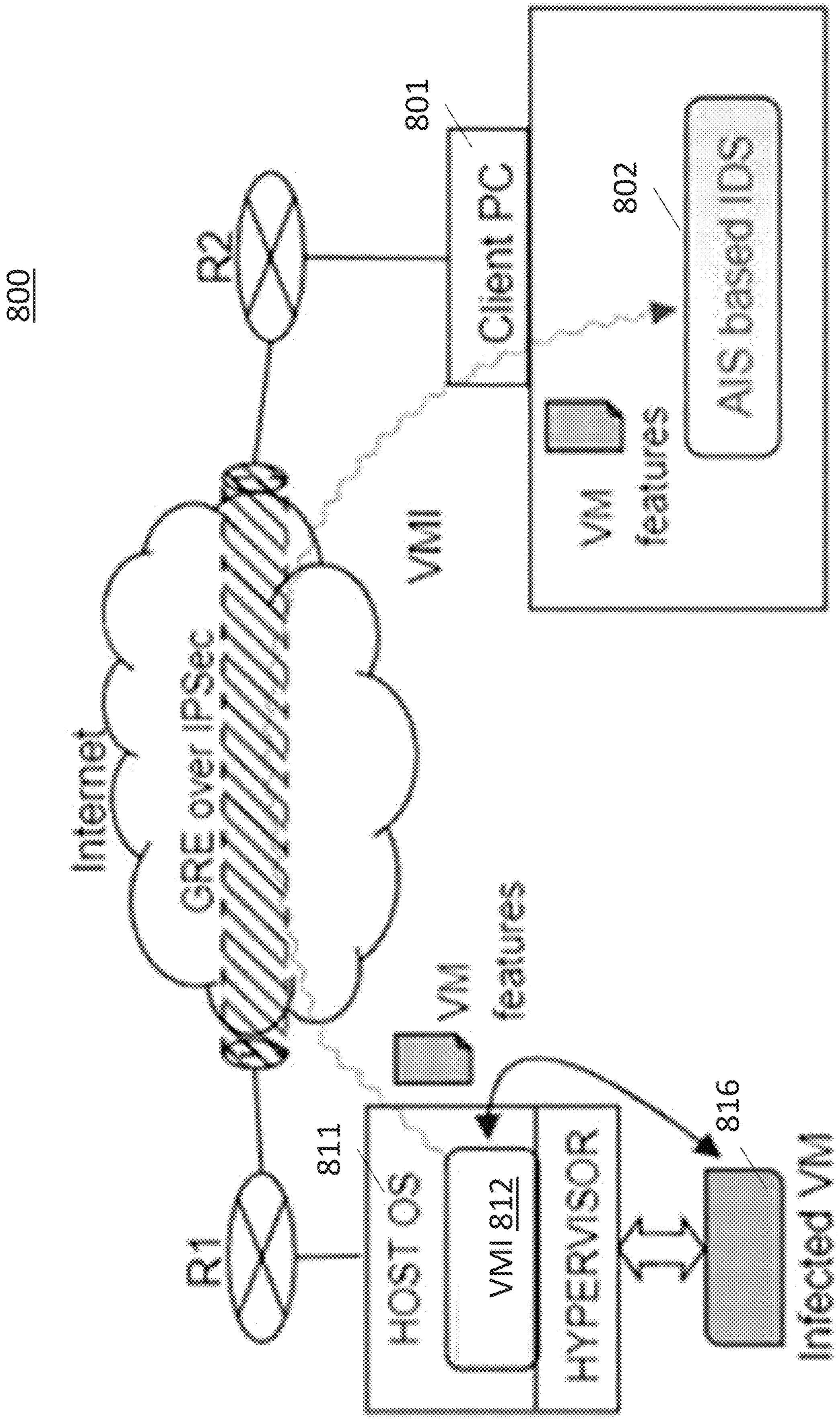
FIG. 8 is a network diagram of a testbed environment in which experimental data is produced in accordance with some embodiments.

FIG. 8 is a network diagram of a testbed environment 800 in which experimental data is produced in accordance with some embodiments.

In the testbed environment 800, a first network switch R1 was at a first location (referred to as a remote location) and a second network switch R2 was at a second location (referred to as a local location) for exchanging data via the Internet. An AIS-based IDS 802 in communication with the second switch R2 was trained at the second location to recognize similar types of malicious applications.

Experimental data was produced using the following configuration: At the first location included a remote host machine 811, for example, including an Intel Xeon® Silver 4114 Processor® 2.20 GHz and 8 cores with 131 GB RAM. Also, at the remote location included a remote VM 812, for example, including an Intel XEON® Silver 4114 Processor® 2.2.0 GHz and 6 GB RAM, UBUNTU® 18.04 LTS. The local location included a client computer 801, for example, including an INTEL® CORE™ 17-8750H® 2.20 GHz processor and 16 GB RAM, UBUNTUQ 18.04 LTS.

The testbed 800 includes a secure GRE tunnel formed through the Internet that originates from the first location and terminates at the second location. The maximum available bandwidth of all the links between the switch R2 and the host 811 were set to 100 Mb per second. Automated network performance tests using a perfSONAR toolkit (Performance Service-Oriented Network monitoring Architecture) conducted to measure following areas: Round trip time and related statistics between nodes, TCP/LDP throughput in both directions (using built-in iperf3 utility), and a one way latency measurement between the nodes (using owping utility). The following table (Table 1) provides an average throughput between the two locations after conducting at least fifty tests using a perfSONAR toolkit.

TABLE 1

| Protocol | Source | Destination | Throughput (Mbits/s) |
|---|---|---|---|
| TCP | Local | Remote | 80 |
| TCP | Remote | Local | 75 |

TABLE 1-continued

| Protocol | Source | Destination | Throughput (Mbits/s) |
|---|---|---|---|
| UDP | Local | Remote | 78 |
| UDP | Remote | Local | 77 |

The feature retrieval time taken by a virtualization software application linked to the IDS 802 was measured from the remote host machine 811 with respect to data flow in the switch R2 using the IDS.

Referring again to FIG. 2, the IDS and VMI module coexist on the same host. However, the testbed environment 800 of FIG. 8 illustrates the IDS 802 having a VMI nodule 812 that is part of the IDS 802 but is stored and executed at the remote host 811 to perform an introspection operation with respect to the VM 816 and can function similar to an application programming interface (API). The AIS-based detector generation and matching operations are performed at the client computer 801. The VMI module 812 and communicates with the AIS-based IDS 802 via a secure GRE tunnel or the like. Here, the MS 802 remotely triggers the VMI module 812 to perform an introspection operation every 10 seconds. This timeframe can be modified accordingly. After an introspection operation on the VM 816 is completed, the IDS 802 collects data from the VMI module 812 through the secure GRE tunnel.

Figure 9A:
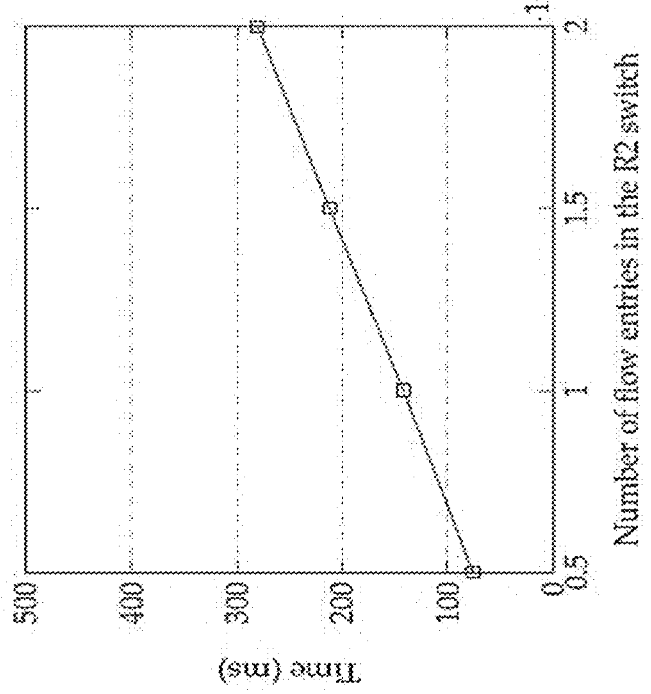
FIGS. 9A and 9B are graphs illustrated a number of flow entries in a remote network switch and a local network switch, respectively, in accordance with some embodiments.
Figure 9B:
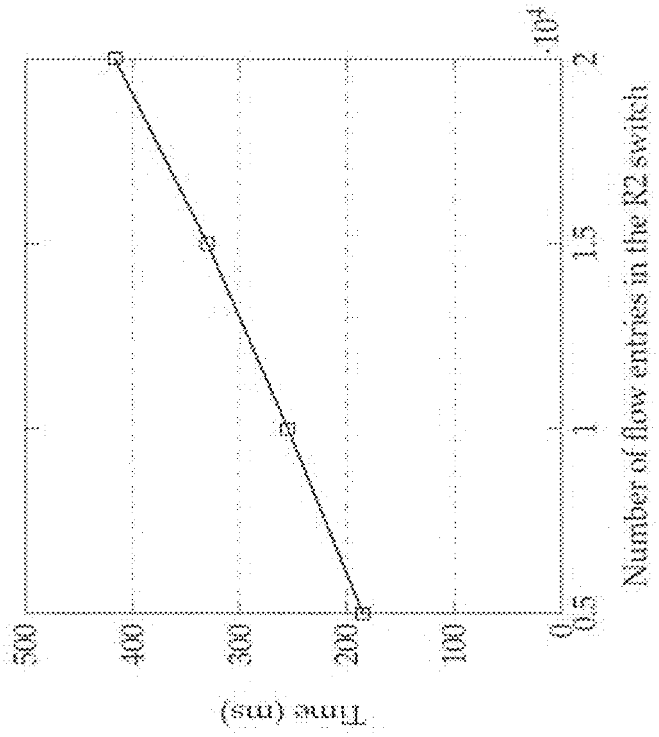

FIG. 9A is a graph 910 illustrating a number of flow entries in a remote network switch, in accordance with some embodiments. FIG. 9B is a graph 920 illustrating a number of flow entries in a local network switch, respectively, in accordance with some embodiments. More specifically, FIG. 9A corresponds to the retrieval of eight (8) preferred features up to 20,000 flow entries through the second switch R2 of FIG. 8. The IDS 802 according to some embodiments collected a list of all available features for 20,000 flow entries at ~416 milliseconds, whereas it was 280 milliseconds for retrieving the 8 best features for the same number of flows. FIG. 9A illustrates the retrieval and processing time of all features up to 20,000 flow entries.

Another important measurement being conducted was determining the time during which the IDS retrieves features from the VM 812. In order to detect potential attacks on time it is important to retrieve features very quickly. It is also important that the process of retrieving features will not affect the productivity of the client machine 801. As shown in FIG. 9B, the flow entry collection by the virtualization software application is up to 20,000 flow entries in the second switch R2 and despite that IDS 802 collected features for all of the flows in 416.4 milliseconds, this does not cause much overhead for the IDS 802 on the client side. It was observed that the feature retrieval time increased linearly with the number of flow entries in the switch. However, the MS 802 performs feature processing in real-time and does not wait to finish every flow entry in the switch before an action is performed. In some embodiments, once data received, the IDS 802 calculates a feature vector by converting raw values into binary tuples followed by classification and all takes 54 milliseconds when the switch has 100 flow entries.

During the training process of detection generation application, a set of 200 records was input, namely, self-samples covering large categories of benign processes to generate a plurality of non-self detectors. Using a GA within a PYTHON™ DEAP framework, for example, described in F. Rainville, F. Fortin, M. Gardner, M. Parizeau and C. Gagné, "*DEAP: a Python framework for evolutionary algorithms*"

in proceedings of the 14th annual conference companion on Genetic and evolutionary computation (GECCO '12) Association for Computing Machinery, New York, N.Y., USA, 85-92. 2012. doi: https://doi.org./10.1145/2330784.2330799, incorporated by reference herein in its entirety, but not limited thereto. Here, about 61,000 unique detectors where generated, for example, a generated detector 1000 as an output from the GA as shown in FIG. 10, Accordingly, a list of detectors can be generated by an application written using PYTHON™ programming language and utilized DEAP framework to perform training and generating the detectors based on the input of normal process features.

In addition to generic keyloggers, the algorithm can be adjusted to detect rootkits, spyware, adware and trojans. Experiments conducted with more than 100 types of different malicious applications, primarily from the available open-source repositories. The average F1 score (detection rate) of the non-self detection by utilizing all features for the list of malwares provided in the table 1100 FIG. 11 was 96.86%. Experiments were divided into two parts, first by exposing remote VM separately to each of the listed malicious applications and measuring the performance along with the detection accuracy. Second, a remote VM was exposed to all four listed malwares simultaneously and subsequently an IDS was activated. In both cases anomalies were detected with almost similar rate and IDS successfully responded on time, as shown in the table 1100 of FIG. 11.

The DEAP computation framework includes parallelization mechanisms that can improve the accuracy of detection by 30% as compared to conventional implementations. During embodiments of the process, a squared (Euclidean) distance can be implemented as a fitness function to measure the distance between self and randomly generated non-self features.

Figure 12:
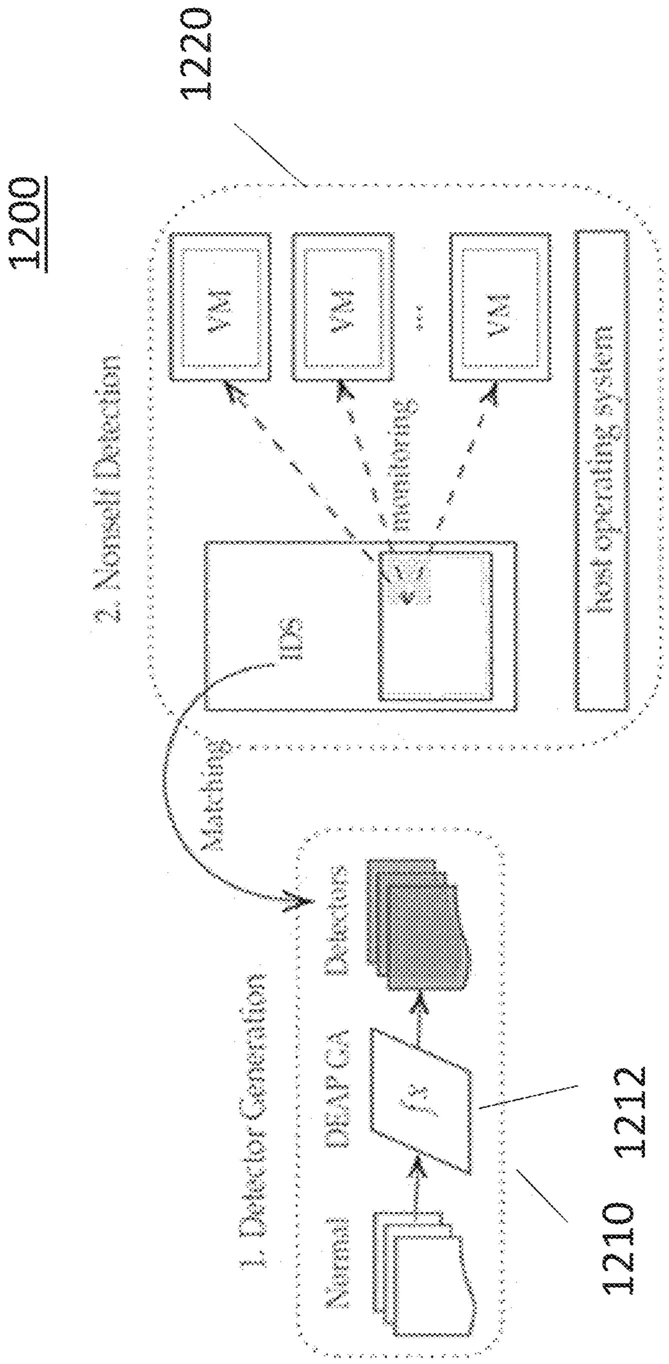
FIG. 12 is a block diagram of a detection system, in accordance with some embodiments.

FIG. 12 is a block diagram of a detection system 1200, in accordance with some embodiments. As shown, the detection system 1200 can execute an NSA on a detection generation processor 1210 for producing and outputting a list of detectors, e.g., a file including of binary strings each corresponding to a generated detector.

The non-self detection processor 1220 is part of the IDS, which processes the file generated by the detection generation processor 1210 as part of a matching process. The IDS also generates detectors for training an AI to recognize malicious processes. Other features of the system 1200 such as virtual machines (VM), virtual software application, and host operating system, for example, may be similar to the host machine having the VMI system 200 described with reference to FIG. 2.

In the detection generation processor 1210, a detector generator utilizes a multiprocessing package that offers both local and remote concurrency that does not rely on a PYTHON™ Global Interpreter Lock but rather uses subprocesses instead of threads. This significantly reduces the time taken by evolutionary algorithm, requiring on average 4-6 seconds to generate a list of 61,000 unique detectors, Constant parameters for the applied Genetic Algorithm 1212 are the following: size of generated detectors=24, initial population of random detectors=500, number of generations=200, amount of pool workers in multiprocessing=4, and constant memory page size=4096.

Figure 13:
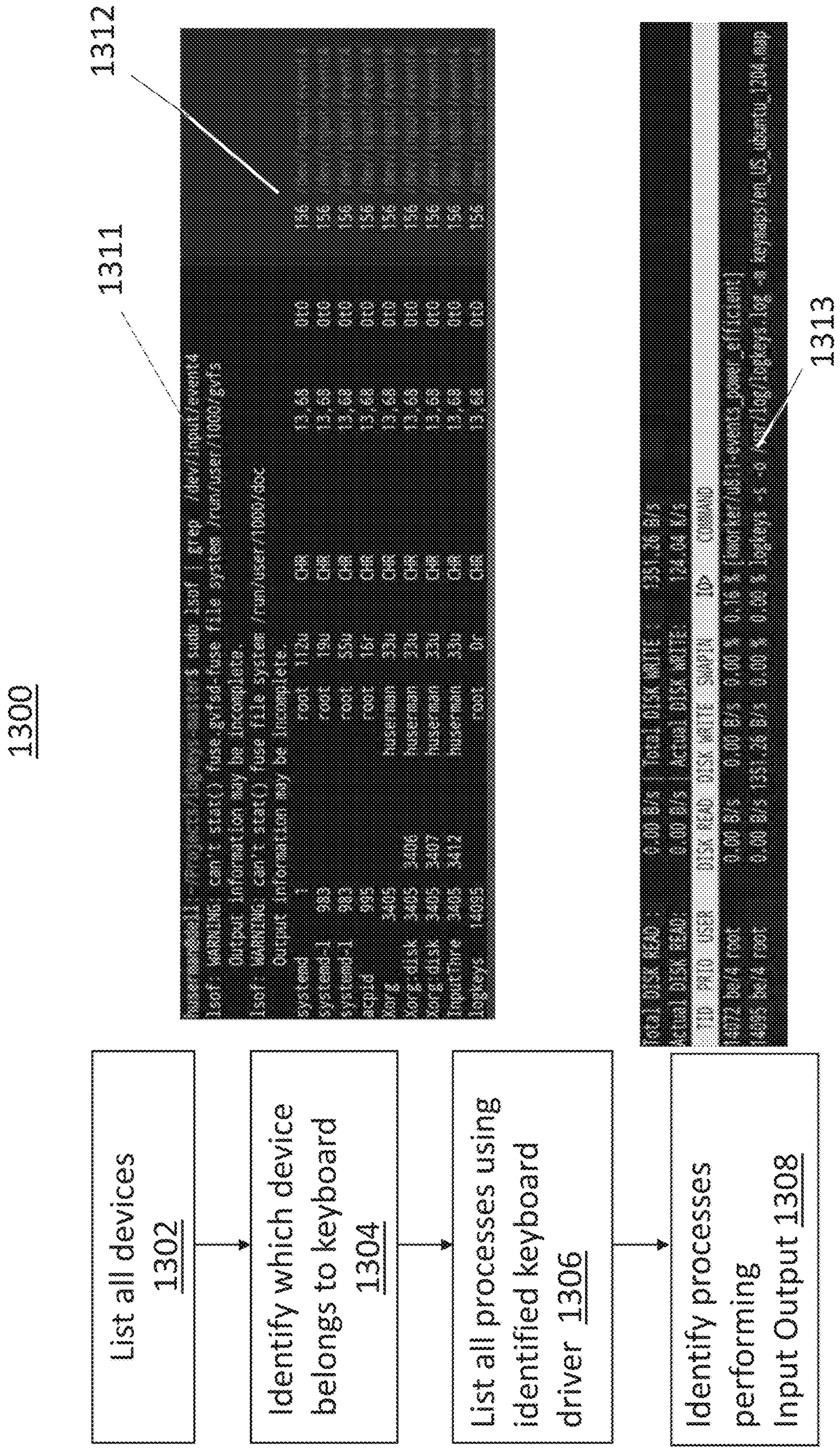
FIG. 13 is a flow diagram of a method for keylogger detection, in accordance with some embodiments.

FIG. 13 is a flow diagram of a method 1300 for keylogger detection, in accordance with some embodiments. Some or all of the method 1300 can be performed by a keylogger detection system, which may include a VMI system and one or more VMs described in embodiments here.

At step 1302, the keylogger detection system lists all devices. At step 1302, the keylogger detection system identifies which device ID belongs to the keyboard of interest. Accordingly, a keyboard driver is identified, for example, /dev/input/event4 1311. At step 1306, a list of all processes 1312 using the identified keyboard driver is listed.

At step 1308, processes are identified that perform an input output function. Line 1313 of the output refers to a keylogger process that is detected because it constantly writes logs.

Figure 14:
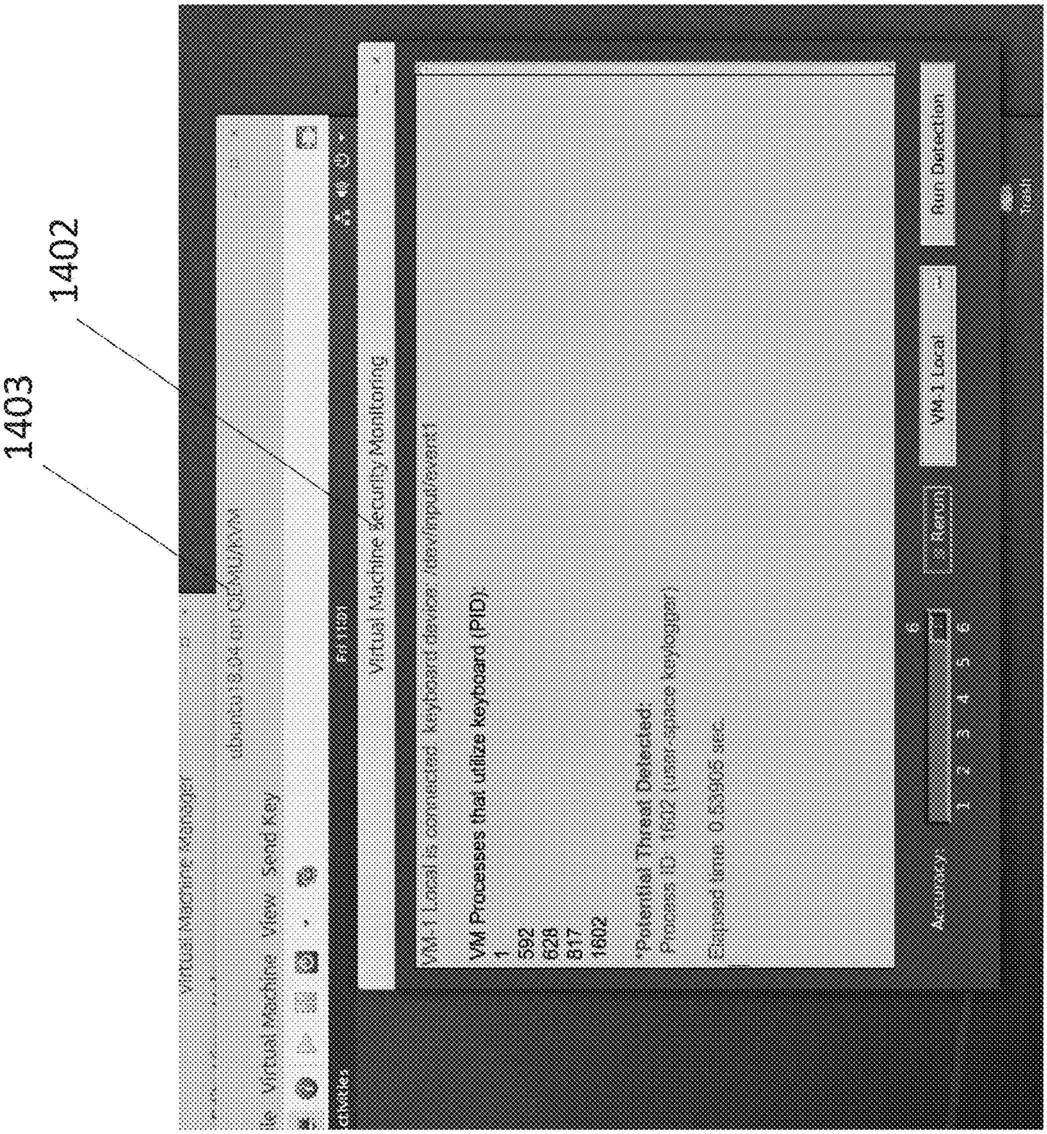
FIG. 14 is a screenshot of a graphical user interface of an IDS, in accordance with some embodiments.

FIG. 14 is a screenshot of a graphical user interface of an IDS, in accordance with some embodiments. Here, an output of a detection process is displayed.

Window 1402 illustrates an output generated by a virtual machine security monitoring software application 1400 that is part of a keylogger detection system, for example, shown and described in embodiments herein. The virtual machine security monitoring software application can be stored and executed on a computer, for example, a MAC®, LINUX® or WINDOWS® client machine, and in some embodiments, is written in the Python programming language that periodically (every 10 seconds) communicates with a VMI module and receives data from it. The application 1400 can monitor multiple VMs.

The application 1400 can perform a dynamic conversion of received data into a binary format and perform a matching process with a generated list of detectors. Every succeeded match considered as a potential threat and application triggers its alert mechanism (visual and email notification).

Also displayed is a virtual machine 1403 which can be launched from any remote (e.g., FIG. 8) or local (e.g., FIG. 2) host. The VMI module is located on a host machine in order to access VM's temporary memory file and perform an introspection operation.

Figure 15:
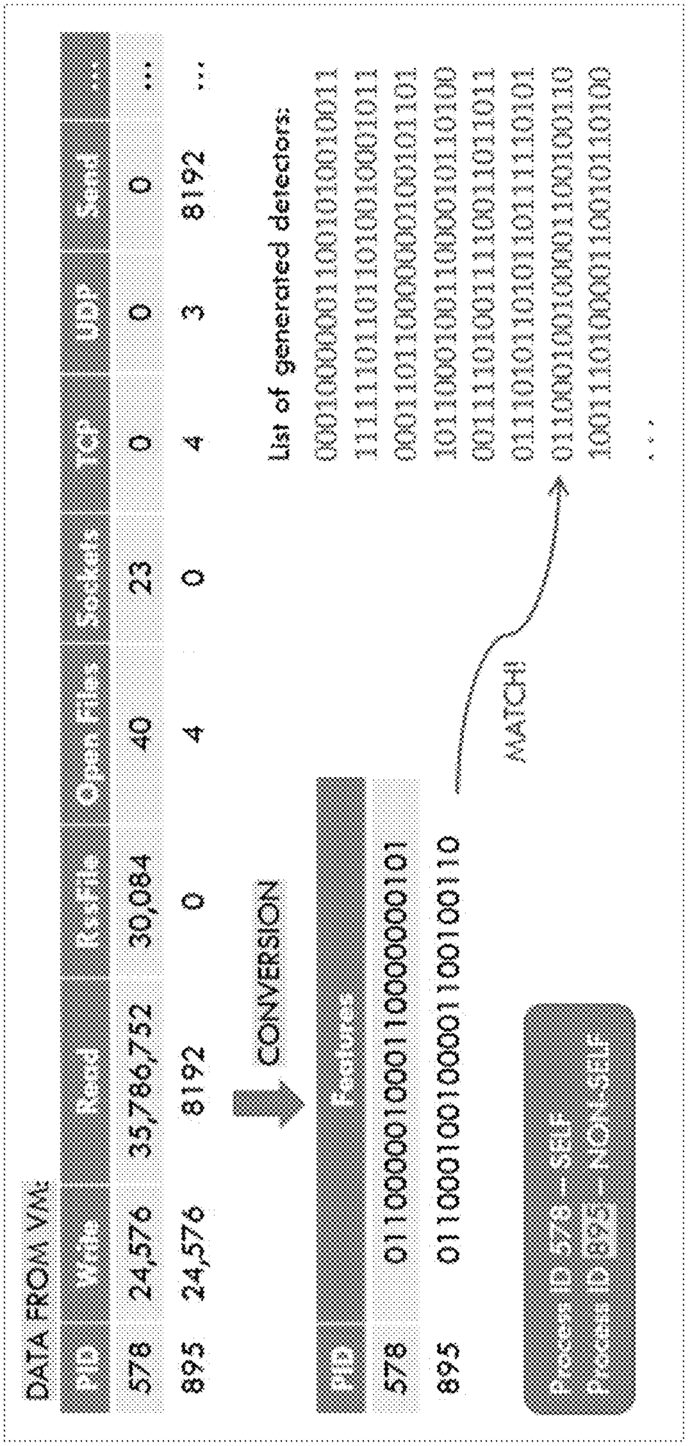
FIG. 15 is an illustrative flow diagram of an example operation performed by a keylogger detection system, in accordance with some embodiments.
Figure 16:
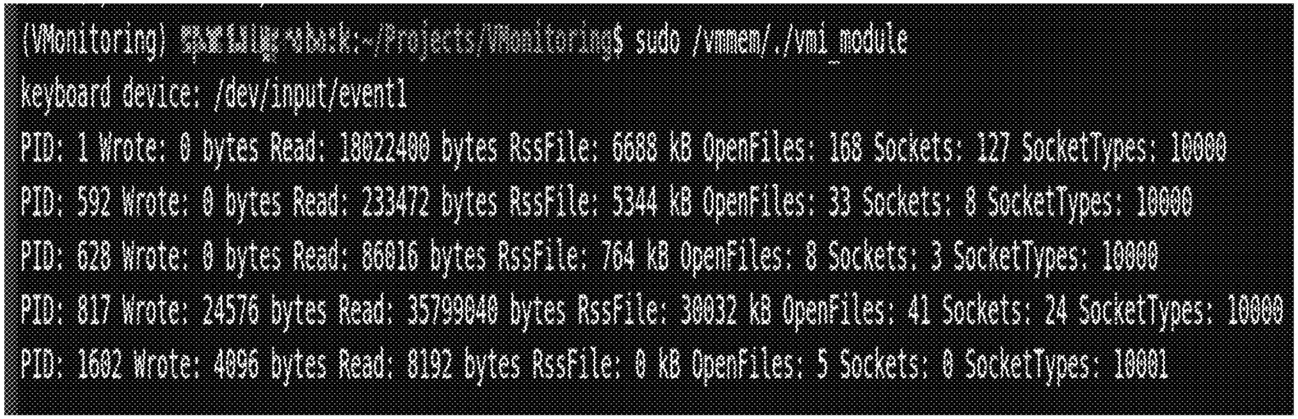
FIG. 16 is a screenshot of an output of a VMI module, in accordance with some embodiments.

FIG. 15 is an illustrative flow diagram 1500 of an example operation performed by a keylogger detection system, in accordance with some embodiments. In particular, an IDS receives data from a VMI module, where a conversion, matching, and detection process is performed. As shown in FIG. 16, the VMI output 1600 may include various features including but not limited to PID: Process IDs, Wrote: system call that shows number of bytes written by the process, Read: system call that shows number of bytes consumed by the process, RssFile: Size of resident file mappings. When applications access the memory mapped netmap memory space the netmap page fault handler allocates a page, and the kernel increments the RSS memory counter for that process, OpenFiles: number of open files attached to the process, Sockets: number of sockets utilized by the process, and/or SocketTypes: represents different types of utilized sockets (TCP, UDP, ICMP, SOCK_STREM data such as send(2), recv(2) calls, read(2) and write(2)).

Embodiments of the disclosed method, system, and computer readable media (or computer program product) may be implemented in software executed on a programmed general-purpose computer, a special purpose computer, a microprocessor, a network server or switch, or the like.

It will be appreciated that the modules, engines, processes, systems, and sections described above may be implemented in hardware, hardware programmed by software, software instructions stored on a non-transitory computer readable medium or a combination of the above. A system as described above, for example, may include a processor configured to execute a sequence of programmed instructions stored on a non-transitory computer readable medium. For example, the processor may include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions may be compiled from source code instructions provided in accordance with a known programming language.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A number of implementations have been described. Nevertheless, it will be understood that the foregoing description is intended to illustrate, and not to limit, the scope of the inventive concepts which are defined by the scope of the claims. Other examples are within the scope of the following claims.

What is claimed is:

1. A computer-implemented keylogger detection system comprising:
- a virtual machine stored at and executed by a computer at an edge location of a network;
- a host operating system stored at and executed by a computer at a central location of the network, wherein the host operating system is external to the virtual machine;
- an Intrusion Detection System (IDS) on the host operating system and external to the virtual machine for introspecting the virtual machine, the IDS comprising:
  - a Virtual Machine Introspection (VMI) module external to the virtual machine such that the IDS operates without deploying any agents within the virtual machine and that accesses the virtual machine to interrogate the virtual machine for possible keylogger events;
  - an Artificial Immune System (AIS)-based detection module that processes results of the introspection of the virtual machine and generates a plurality of detectors that distinguish normal processes from characteristics of malicious processes; and
  - a computer processor that matches an output of the VMI module in response to interrogating the virtual machine with the detectors to identify a suspicious process of the possible keylogger events at the virtual machine.

2. The keylogger detection system of claim 1, wherein the VMI module is configured to interrogate the virtual machine at predetermined time intervals and generates a report of contents of the virtual machine for output to and analysis by the computer processor.

3. The keylogger detection system of claim 1, wherein the report of contents of the virtual machine include a combination of image information, debugged processes, in-memory files, kernel interrupt table, interrupts, system calls, network information, open files, VM processes, and socket data.

4. The keylogger detection system of claim 1, wherein the AIS-based detection module generates the plurality of detectors according to a Negative Selection Algorithm (NSA), and wherein the NSA trains the AIS-based detection module to distinguish normal processes from characteristics of malicious processes in subsequent generations of detectors generated by the AIS-based detection module.

5. The keylogger detection system of claim 1, wherein the malicious processes at the VM include one or more of keyloggers, network-based intrusions, spyware, adware, trojans, and rootkits.

6. The keylogger detection system of claim 4, wherein the VMI module external to the virtual machine monitors the virtual machine to identify possible keylogger-related behaviors by extracting low-level memory and process data, and wherein the AIS-based detection module collects the extracted low-level memory and process data applies a Negative Selection Algorithm (NSA) to compare the data against a trained set of detectors that distinguish the malicious processes from the normal processes.

7. The keylogger detection system of claim 1, wherein the AIS-based detection module comprises:

a detection generation processor configured to generate detectors trained on features of normal system behavior based on data received from the VMI module and a non-self detection processor for applying the detectors using a Negative Selection Algorithm (NSA) to identify deviations indicative of the malicious processes.

8. The keylogger detection system of claim 5, wherein one or more of the malicious processes is identified while the virtual machine is operational and without an IDS installed in the virtual machine.

9. The keylogger detection system of claim 1, wherein the VMI module performs introspection without requiring installation of any monitoring agent, daemon, or intrusion detection software within the virtual machine.

10. A malicious process detection system, comprising:

a Virtual Machine Introspection (VMI) module external to at least one virtual machine and operating without deploying any agents within the virtual machine and that performs an introspection operation on the at least one virtual machine; and an Intrusion Detection System (IDS) external to at least one virtual machine that communicates with the VMI module to generate data that is analyzed by an Artificial immune System (AIS)-based detection module of the IDS using a negative selection algorithm (NSA) and that identifies suspicious processes at the at least one virtual machine based on the analyzed data.

11. The malicious process detection system of claim 10, wherein the VMI module provides an application programming interface (API) for the IDS to securely collect and analyze data from the at least one virtual machine.

12. A keylogger detection system comprising:

a virtual machine having a memory and at an edge location of a network;

an Intrusion Detection System (IDS) external to the virtual machine for introspecting the virtual machine, comprising:

a Virtual Machine Introspection (VMI) module external to the virtual machine such that the IDS operates without deploying any agents within the virtual machine and that accesses the memory of the virtual machine to interrogate the virtual machine for possible keylogger events;

an Artificial Immune System (AIS)-based detection module that processes results of the introspection of the virtual machine and generates a plurality of detectors that distinguishes normal processes from characteristics of a malicious process; and a computer processor that matches an output of the VMI module in response to interrogating the virtual machine with the detectors to identify malicious processes of the possible keylogger events at the virtual machine.

13. The keylogger detection system of claim 12, further comprising:

a host operating system, wherein the VMI module and virtual machine are positioned on the host operating system at a remote host computer such that the host operating system is external to the virtual machine, and wherein the AIS-based detection module and the data processing module are stored and executed on a computer remote from the remote host computer.

* * * * *